March 15, 1966 M. H. GROVE 3,239,921
METHOD FOR MANUFACTURE OF VALVE BODIES
Filed April 30, 1962 3 Sheets-Sheet 1
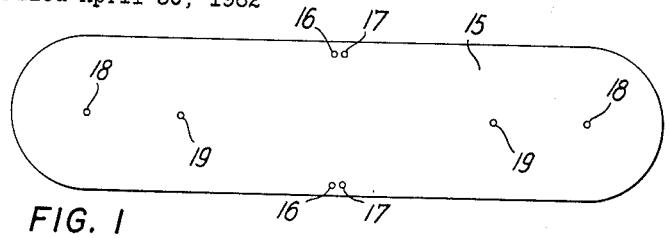
FIG. 1
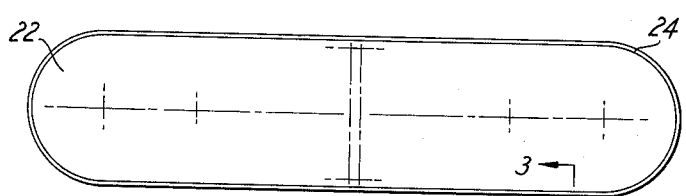
FIG. 2
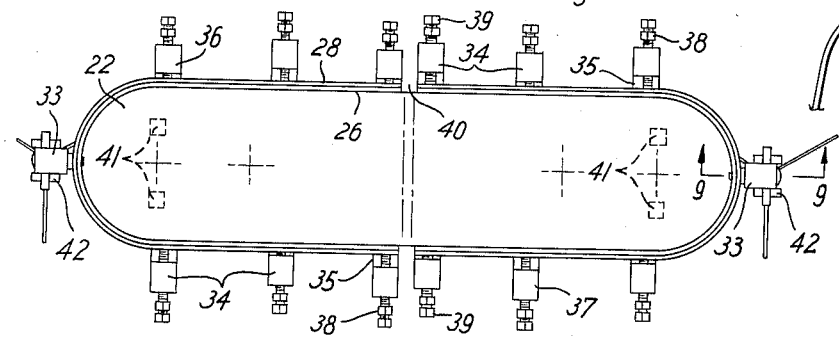
FIG. 8
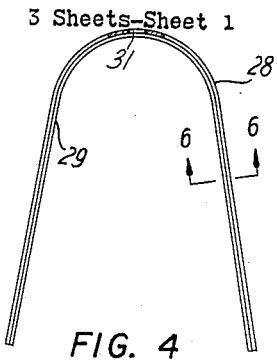
FIG. 4
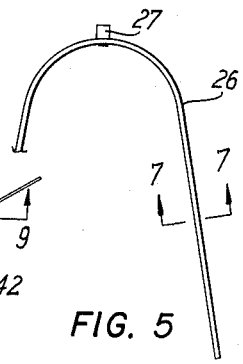
FIG. 5
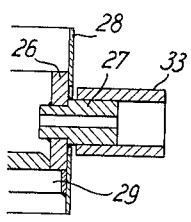
FIG. 9
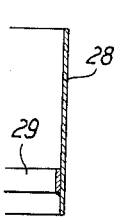
FIG. 6
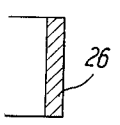
FIG. 7
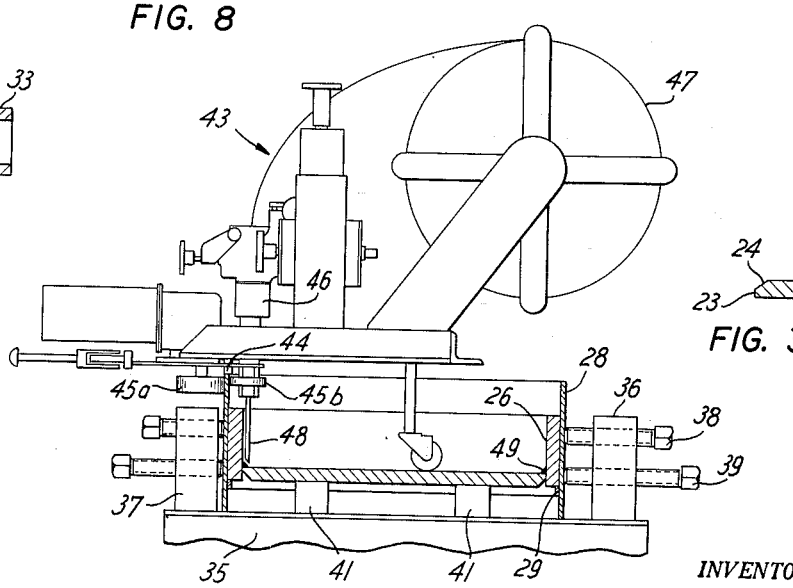
FIG. 10
FIG. 3
INVENTOR.
Marvin H. Grove
BY
*Flehr and Swain*
ATTORNEYS.

March 15, 1966　　　M. H. GROVE　　　3,239,921
METHOD FOR MANUFACTURE OF VALVE BODIES
Filed April 30, 1962　　　3 Sheets-Sheet 2

INVENTOR.
Marvin H. Grove
BY
ATTORNEYS.

March 15, 1966  M. H. GROVE  3,239,921
METHOD FOR MANUFACTURE OF VALVE BODIES
Filed April 30, 1962  3 Sheets-Sheet 3

INVENTOR.
Marvin H. Grove
BY
ATTORNEYS.

United States Patent Office 3,239,921
Patented Mar. 15, 1966

3,239,921
METHOD FOR MANUFACTURE
OF VALVE BODIES
Marvin H. Grove, Piedmont, Calif., assignor to M & J
Engineering Co., Houston, Tex., a partnership
Filed Apr. 30, 1962, Ser. No. 190,621
5 Claims. (Cl. 29—157.1)

This invention relates generally to methods for the fabrication of valve bodies, particularly for valves of the gate type.

Commercial valves of the gate type have been constructed with bodies formed by welding together structural steel shapes, such as steel plates, angles, and the like. In a typical instance such a valve body is rectangular or box-like in section, with end walls having openings for making connection with associated hubs. The valve gate may be a flat slab or plate which is disposed within the body and connected with suitable operating means. As disclosed in my copending application Serial No. 149,648, filed November 2, 1961, now abandoned, such a fabricated valve body can consist of plate like end walls having their edges welded to a metal strip which forms the intermediate side and bottom connecting walls.

It is an object of the present invention to provide a novel method for manufacturing fabricated valve bodies of the above character, which will facilitate low cost production.

Another object of the invention is to provide a method of the above character which will facilitate the welding operations required to complete a body tube, and which in particular will permit machine welding operations to be employed.

Another object of the invention is to provide a method of the above character which will enable the manufacture of fabricated valve bodies to a relatively high degree of accuracy, without resorting to expensive machining methods.

Additional objects and features of the invention will appear from the following description in which the preferred embodiment has been set forth in detail in conjunction with the accompanying drawing.

Referring to the drawing:

FIGURE 1 is a plan view showing a jig used for making preliminary marks.

FIGURE 2 is a plan view illustrating a steel plate which has been cut to predetermined configuration in accordance with the marking applied by jig 15.

FIGURE 3 is a detail in section on an enlarged scale taken along the line 3—3 of FIGURE 2.

FIGURE 4 is a plan view partially in section illustrating a U-shaped part which is used in the method.

FIGURE 5 is a plan view showing a U-shaped strip which is used to form a part of the fabricated body.

FIGURE 6 is a detail in section on an enlarged scale taken along the line 6—6 of FIGURE 4.

FIGURE 7 is a detail in section on an enlarged scale taken along the line 7—7 of FIGURE 5.

FIGURE 8 is a plan view showing an assembly including the parts shown in FIGURES 4 and 5 together with a plan as shown in FIGURE 2, the parts being held together by clamps.

FIGURE 9 is a cross sectional detail on an enlarged scale taken along line 9—9 of FIGURE 8.

FIGURE 10 is a side elevational view partially in section illustrating welding equipment applied to FIGURE 8.

Figure 13:
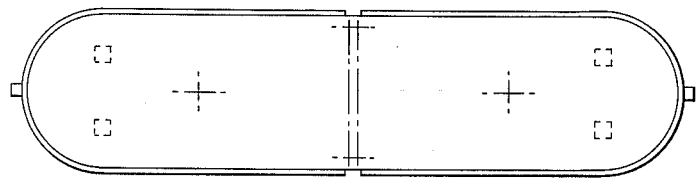

FIGURE 13 after openings have been cut into the body moval of the clamping means.

Figure 14:
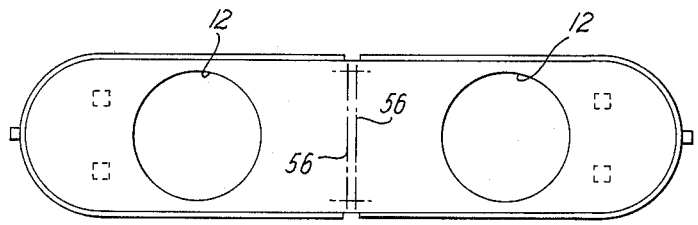

FIGURE 14 is a plan view of the assembly shown in FIGURE 13 after openings have been cut into the body parts.

Figure 15:
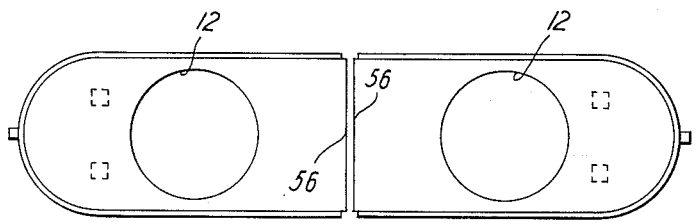

FIGURE 15 is a plan view like FIGURE 14 but showing the two body parts after the assembly of FIGURE 14 has been cut into two parts.

Figures 16, 17:
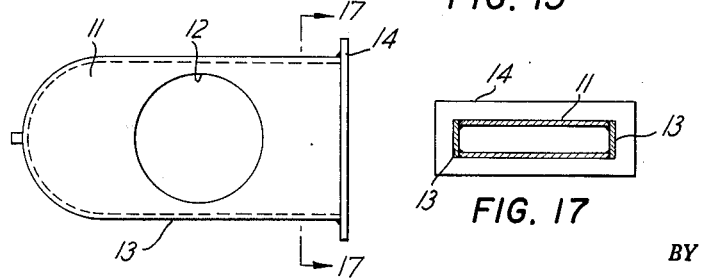

FIGURE 16 is a plan view showing a finished fabricated valve body.

FIGURE 17 is a cross sectional view taken along the line 17—17 of FIGURE 16.

Figure 18:
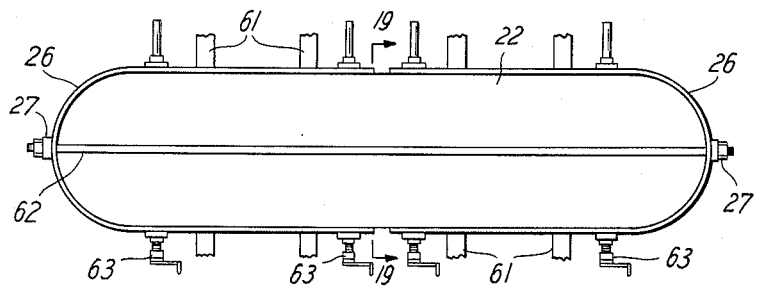

FIGURE 18 is a plan view illustrating the first phases of a simplified procedure incorporating my method.

Figure 19:
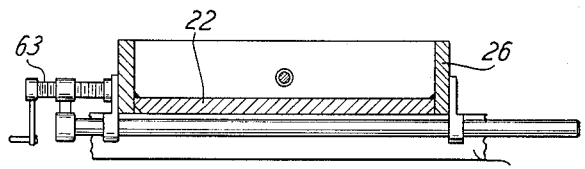

FIGURE 19 is a cross sectional detail taken along the line 19—19 of FIGURE 18.

Figure 20:
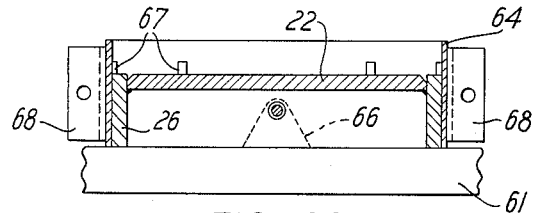

FIGURE 20 is a cross sectional view like FIGURE 19 but showing the guide bands applied to the assembly.

Figure 21:
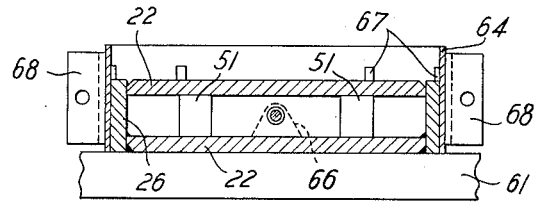

FIGURE 21 is a cross sectional view like FIGURE 19 showing the assembly inverted and with the second side plate applied.

Figure 22:
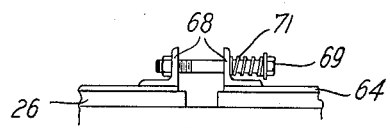

FIGURE 22 is a plan detail illustrating how the ends of the side guide bands can be yieldably secured together.

FIGURES 16 and 17 illustrate a valve body such as is constructed by use of the present method. This body consists of the parallel plate-like walls 11, which are provided with aligned openings 12 for making connection with associated valve body hubs. The plate-like walls 11 are connected at their edges by the intermediate wall 13, which forms the sides and the bottom of the body. The bonnet end of the body is shown provided with a suitable flange 14, which serves to mount bonnet and valve operating means.

FIGURES 1 to 15, inclusive illustrate various stages in the manufacturing method, and certain jigs and appliances which are employed. FIGURE 1 illustrates a jig 15, in the form of a metal plate having a number of marking holes. Thus holes 16 and 17 are near the center of the jig. Holes 18 are at the centers of the semi-circular end margins 21, and holes 19 are at the centers of the body openings 12, which eventually are formed in the fabricated body. This jig is placed upon a flat steel plate which is to be used to fabricate the walls 11 of the body. A center punch is applied through the opening 17, 18 and 19, to mark these positions. A suitable tool can be employed to mark about the edge of the jig to indicate the trace path to be taken by a metal cutting torch. It will be understood that a number of such walls will be marked out upon the steel plate, so that a number of wall portions can be cut out simultaneously or consecutively, depending upon the character of the torch burning equipment employed. After such marking, lines passing through the marked centers can be scribed as shown in FIGURE 2.

The cutting torch employed may be entirely manual, fully automatic or semi-automatic. Preferably, however, this operation is carried out with guided torches, including one torch making a vertical cut directly through the plate, and a second trailing torch which applies a suitable bevel. After cutting the edge of the plate may appear as shown in FIGURE 3. The vertical and belveled edge portions are indicated 23 and 24. In most instances these torch cut surfaces can be made relatively smooth without grinding or other machining operations. However, if desired, these surfaces can be subjected to light grinding, to remove any burrs or scale.

A plate part 22 produced as described above is now assembled together with other members 26 and 28 shown in FIGURES 4 and 5. Both of these members are U-shaped. The member 26 shown in FIGURES 5 and 7 is a simple metal strip which eventually forms the wall portion 13 of the body. It is bored and fitted with a stud 27 (FIGURE 9), which is welded to the strip. The stud is shown provided with an inner passage, whereby it eventually can serve as a body drain plug in the finished valve. The metal strip or band 28 shown in FIGURES 4 and 6 may be of lesser thickness than strip 26, but is considerably wider. It is provided with a locating shoulder 29 adapted to engage one edge of the strip 26. It is formed with an opening 31 of such dimensions as to accommodate the stud 27. Strips 28 are adapted to nest over the strips 26 in the manner shown in FIGURES 8 and 9, with the shoulders 29 underlying the lower edge of strip 26. As will be presently explained the strip 28 forms two trackways for supporting and guiding welding equipment. The dimensions of the strips 28 and 29 are such that their ends are contiguous when nested.

Two pairs of the strips 26 and 28 are assembled about the plate 22, in the manner shown in FIGURE 8. Sleeves 33 are shown engaged over the studs 27, whereby these studs can later be used to support the assembly. The appliances illustrated in FIGURE 8 which are used in making the assembly, include a plurality of clamps 34. The clamps may consist of a rigid beam 35, standards 36 and 37 mounted upon the beam and clamping screws 38 and 39. Spacer blocks 41 are inserted between the plate 22 and the beams 35, and the spacing conforms to the dimensioning of the strips 28, whereby the lower edges of these strips also engage the top surfaces of the beams 35, with the shoulders 29 engaging the lower edges of the body strip 26. Also the dimensioning is such that the lower edges of the body strips 26 are coplanar with the lower face of the plate 22. The assembly operations just described can be carried out with the clamps resting on a suitable table. After all of the clamps are properly tightened, this entire assembly can be removed from the table and supported upon the vertical standards 42, with the sleeves 33 engaging suitable rollers whereby the assembly can be rotated about the horizontal axis of the studs. Note that gaps 40 are provided between the adjacent ends of the strips 26 and 28.

A suitable welding appliance 43 is now applied to the assembly described above. The upper projecting edge of the strip 28 is used as tracking means for this equipment. Thus the equipment 43 may have roller 44 engaging the upper edge of strip 28, and rollers 45a and 45b engaging the outer and inner faces of the strip. Certain of the side rollers may be spring urged to enable movement about the curved portion of strip 28. A suitable welding head 46 receives welding wire from the reel 47, and feeds this wire downwardly through the nozzle 48. Preferably the welding technique used by such equipment is of the submerged flux bed type, wherein a powdered vitreous flux is applied over the area to be welded, and the welding wire fed into the flux to carry out welding operations below the same. Tracking of the welding equipment 43 preferably is such that it operates automatically and continuously, to produce the inner weld connection 49. In accordance with well known welding methods, the number of passes employed can be adjusted to apply the amount of weld metal desired.

If desired, hand tack welding can be applied between plate 22 and the strips 26, before the assembly is shifted to the standards 42.

Figure 11:
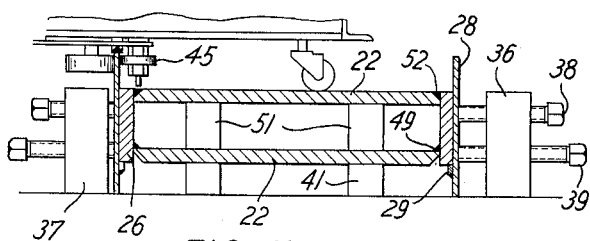
FIGURE 11 is a detail in section showing the assembly of FIGURE 8 after applying a second body part and illustrating a second exterior body weld being made.

After forming the inner weld 49 between the plate 22 and the strip 26, a second plate 22 is fitted into the assembly in the manner shown in FIGURE 11. The special blocks 51 are so dimensioned that when the upper plate 22 is dropped into place, its upper surface is contiguous with the uppermost edge of strip 26. The welding equipment 43 is again applied in the manner illustrated in FIGURE 11, and operated to produce an exterior weld 52 between the upper plate 22 and the upper margin of strip 26. Here again as many passes as are required are made in order to lay down the desired amount of hot metal.

Figure 12:
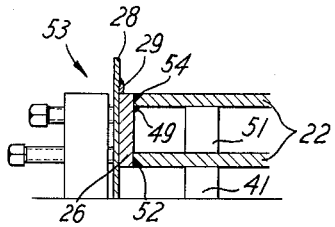
FIGURE 12 is a detail in section illustrating how the assembly in FIGURE 11 has been treated for a second exterior welding operation.

Following the operation described above, a second set of clamps 53, which may be the same as clamps 34, are applied on top of the assembly, in between the clamps 34. After the clamps 53 are tightened against the strip 28, the lower clamps 34 are loosened and removed. The entire assembly is now inverted, as indicated in FIGURE 12. Welding equipment 43 is again applied to the guide strip 28, and the exterior weld 54 is applied in the same manner as the previously formed exterior weld.

Following the above the clamps 53 are removed from the assembly, together with the strips 28. The body parts now appear as shown in FIGURE 13. This assembly is placed upon suitable supporting means (e.g., a cutting table) where torch cutting operations can be carried out. Thus the aligned holes 12 can be torch cut in the plates 22, and the assembly is cut into two bodies along the intermediate cutting lines 56. It will be evident that if desired the assembly can be cut into two bodies prior to forming the holes 12. The flanges 14 can now be applied by welding. Further inside welding can be applied between walls 11 and 13, as may be desired for proper strength.

It will be evident from the foregoing that I have provided a novel procedure for manufacturing fabricated valve bodies. The procedure greatly facilitates the assembly of the plate-like walls 22 with the side body strip 26, and permits all of the body welding operations to be carried out to provide utmost accuracy in the final fabricated bodies The method also makes effective use of automatic welding and torch cutting operations.

FIGURES 18 to 22, inclusive, illustrate a simplified method incorporating my invention. FIGURE 18 illustrates one of the plates 22 resting upon the parallel support rails 61, with the beveled edge faced downwardly. Two of the strips 26 are positioned about the plate 22 in the manner shown in FIGURES 18 and 19, with the lower edge of each strip in contact with the upper surfaces of the rails 61. A bolt or tie bar 62 is inserted through the fittings 27, and is drawn sufficiently tight to hold the strips 26 in position. Relatively light clamps 63 are applied to hold the side branches of the strips 26 against the side edges of the plate 22.

After forming the assembly described above, a weld is applied between the lower margin of the strips 26 and the peripheral edges of the plate 22. This welding can be carried out by either machine, hand methods, or both, but with relatively good heat penetration. Application of this weld will tend to cause the strips 26 to be drawn inwardly.

The next step is to remove the clamps 63 and invert the assembly upon the rails 61. The bands 64 are now applied about the assembly. These bands are U-shaped like the bands 28 shown in FIGURE 4, but without the shoulder 29. The lower edges of these bands are brought into contact with the upper surfaces of rails 61. The overall width of the bands 64 is somewhat less than the band 28 as shown in FIGURE 9, but the width is sufficient whereby the band 64 extends upwardly beyond the body to serve as tracking means. At the ends of the body the bands 64 are provided with notches 66 to accommodate the fittings 27.

To facilitate retention and proper positioning of the bands 64, they are shown provided with locating lugs 67 which are adapted to engage the upper edges of the side strips 26. Also the ends of these strips are shown provided with outwardly extending flanges 68, which are yieldably connected together by bolts 69, which act through the compression springs 71.

The bands 64 normally are clamped upon the body by the use of the clamps 63 as shown in FIGURE 18. With the assembly in the form shown in FIGURE 20, a welding machine is tracked upon the upper edge of the bands 64 to form an exterior weld between the plate 22 and the side strips 26.

As previously mentioned, application of the first interior weld causes some distortion or pulling in of the side strips 26. However, this distortion is largely corrected when the exterior weld is made with the assembly as in FIGURE 20.

Following making the first exterior weld, the clamps are removed together with the side bands 64. Preferably this second plate is made slightly smaller (in width and length) than the first plate. The second plate is now positioned within the assembly in the manner shown in FIGURE 21. The spacer blocks 51 are employed as described in connection with FIGURE 11 to provide proper spacing between the two plates 22. At this time a clearance, which may be of the order of ⅛ of an inch, may exist between the periphery of the upper plate 22 and the upper margin of the side strips 26, by virtue of the smaller size of the second plate. By means of suitable welding, which may be by hand, or a combination of hand and machine welding, the edge of the upper plate 22 is now welded to the upper margins of the strips 26 to form an effective exterior weld connection between these parts. This weld may be made by the "Dip Transfer" method.

After forming an exterior welding operation for the upper side of the body, as shown in FIGURE 21, the bands 64 are removed, the body inverted and the bands 64 reapplied for a second exterior weld upon the other side. The holes 12 may now be cut in the side plates. Thereafter the body is cut into two parts as previously described in connection with FIGURE 15, and flanges 14 applied as shown in FIGURES 16 and 17.

I claim:
1. In a method for the manufacture of valve bodies of the fabricated type having parallel plate-like end walls connected together at their edges by intermediate side walls, the steps of forming a flat plate to a configuration corresponding to one of said end walls, forming a U-shaped metal strip corresponding to said end walls, applying a U-shaped tracking band about the U-shaped strip, the band serving to track a welding head, clamping the strip and the tracking band about the edge of the plate, forming a weld between the strip and the plate by use of a welding head tracked on said band, positioning a second plate within the strip in spaced parallel relationship with the first plate, and thereafter forming a weld by use of a weld head between the second plate and the upper edge of said strip, the tracking band being used in forming said head for said last-named weld.

2. In a method for the manufacture of valve bodies of the fabricated type having parallel plate-like end walls connected together at their edges by intermediate side walls, the steps of forming plates to a configuration corresponding in each instance to the configuration of two of said end walls disposed end to end, the end edges of said plates being arcuate and the side edges being straight and parallel, forming a pair of U-shaped strips corresponding to said side walls and having a width corresponding to the desired thickness of the valve body, each such strip having a curved portion corresponding to an arcuate end edge of the plate and substantially straight side portions, applying U-shaped tracking bands about the U-shaped strip to form a track for a welding head, clamping two of said strips and two of said tracking bands about the plate whereby the arcuate portions of the strips are contiguous with the arcuate end edges of the plates and the side portions of said strips are contiguous with the straight parallel edges of the plate, carrying out a welding operation between the peripheral edge of the plate and the lower margins of the first named strips by use of a well head tracked on said bands, thereafter welding a like plate to the other margins of said strips, and then severing the plates to form two valve bodies.

3. A method as in claim 2 in which spacer blocks are inserted between the two plates.

4. A method as in claim 2 in which after welding the second plate to the strips, the assembly is inverted and a second weld formed by a well head between the first named plate and the adjacent margins of the strips, the tracking being used to track said weld head for said last named weld.

5. A method as in claim 2 in which the opposed ends of the strips are spaced apart to facilitate severing the plates without cutting the strips.

References Cited by the Examiner

UNITED STATES PATENTS

| | | | |
|---|---|---|---|
| 2,187,431 | 1/1940 | Powell | 29—493 X |
| 2,510,083 | 6/1950 | Davis et al. | 219—126 X |
| 2,683,581 | 7/1954 | Rovang | 251—329 X |
| 2,873,943 | 2/1959 | Williams | 251—329 X |
| 2,956,147 | 10/1960 | Baker | 219—125 X |
| 3,000,083 | 9/1961 | Bryant | 29—157.1 |

FOREIGN PATENTS 912,649    5/1954    Germany.

WHITMORE A. WILTZ, *Primary Examiner.*